(12) United States Patent
Nishiji et al.

(10) Patent No.: US 6,780,136 B2
(45) Date of Patent: Aug. 24, 2004

(54) COMBINED DIFFERENTIAL GEAR DEVICE

(75) Inventors: Makoto Nishiji, Saitama (JP);
Shinichiro Nakajima, Auderghem (BE); Seiya Ikeda, Tochigi (JP)

(73) Assignee: Toyoda Koki Kabushiki Kaisha, Aichi (JP)

(*) Notice: Subject to any disclaimer, the term of this patent is extended or adjusted under 35 U.S.C. 154(b) by 0 days.

(21) Appl. No.: 10/227,095

(22) Filed: Aug. 23, 2002

(65) Prior Publication Data

US 2003/0045391 A1 Mar. 6, 2003

(30) Foreign Application Priority Data

Sep. 6, 2001 (JP) ........................................ 2001-269912

(51) Int. Cl.[7] .............................................. F16H 48/06
(52) U.S. Cl. ...................................................... 475/221
(58) Field of Search .......................... 475/221; 180/248

(56) References Cited

U.S. PATENT DOCUMENTS

| 4,817,753 | A | * | 4/1989 | Hiketa | 180/249 |
| 5,176,589 | A | * | 1/1993 | Borgudd | 475/221 |
| 5,902,206 | A | * | 5/1999 | Oda et al. | 475/221 |
| 6,117,038 | A | * | 9/2000 | Nishiji et al. | 475/221 |
| 2003/0050146 | A1 | * | 3/2003 | Nishiji et al. | 475/331 |
| 2003/0078131 | A1 | * | 4/2003 | Nishiji | 475/221 |

FOREIGN PATENT DOCUMENTS

| EP | 1239188 A1 | * | 9/2002 | F16H/48/00 |
| JP | 10-220556 A | | 8/1998 | |

* cited by examiner

Primary Examiner—Richard M. Lorence
(74) Attorney, Agent, or Firm—Thomas B. Ryan; Brian B. Shaw; Harter, Secrest & Emery, LLP

(57) ABSTRACT

A casing 23 of a second differential gear mechanism 2 is constituted by a carrier 19 and a sun gear 22 which are separately formed. Owing to this arrangement, the casing 23 is divided into two parts in a direction of its axis. The carrier 19 is movable in a direction of an axis L. By meshing engagement between a pinion gear 26 and a side gear 27A, the carrier 19, which forms a part of the casing 23, is press contacted with a housing 11 through a washer 29.

8 Claims, 5 Drawing Sheets

COMBINED DIFFERENTIAL GEAR DEVICE

BACKGROUND OF THE INVENTION

This invention relates to a combined differential gear device including a first differential gear mechanism and a second differential gear mechanism which is built in the first differential gear mechanism.

Heretofore, there has been known one, as a differential gear device of this type, which is disclosed in Japanese Patent Application Laid-Open No. H10-220556, for example. The combined differential gear device disclosed in this Laid-Open publication comprises a housing (input member) driven for rotation, at least a pair of planetary gears disposed within this housing in parallel with an axis of the housing such that they can rotate about their own axes, and a pair of side gears (output members) rotatably disposed within the housing with their axes aligned with the axis of the housing. The pair of planetary gears are in meshing engagement with each other and also in meshing engagement with the pair of side gears, respectively. The first differential gear mechanism is constituted by the housing, the pair of planetary gears and the pair of side gears. A rotary torque input into the housing is distributed to the pair of side gears through the pair of planetary gears.

One of the pair of side gears is provided with a casing of the second differential gear mechanism such that the casing can rotate in unison with the side gear. This casing is provided therein with a pinion gear constituted by a bevel gear whose axis is orthogonal to an axis of the casing and a pair of second side gears whose axes are aligned with the axis of the casing. The pinion gear and the second side gears are rotatably supported on the casing and meshed with each other. Accordingly, the rotary torque distributed to the above-mentioned one of the pair of side gears is further distributed to the pair of second side gears. The rotary torque distributed to one of the second side gears is transmitted, for example, to one of the left and right front wheels or one of the left and right rear wheels. On the other hand, the rotary torque distributed to the other side gear is transmitted to a rear differential gear device in case the combined differential gear device is used as a center and front differential gear device, and transmitted to a front differential gear device in case the combined differential gear device is used as a center and rear differential gear device. Then, the rotary torque is transmitted from the rear or front differential gear device to the left and right rear wheels or the left and right front wheels.

In a vehicle equipped with a combined differential gear device thus constructed, it is demanded that the rotary torque transmitted to the front wheels is different in magnitude from the rotary torque transmitted to the rear wheels. In such a case, it is required to increase the ratio of the rotary torque, i.e., torque bias ratio, transmitted to the pair of side gears as output members. However, in the conventional combined differential gear device, in order to increase the torque bias ratio between the pair of side gears, attention is paid only to the side gears and the planetary gears of the first gear mechanism but no attention is paid to the second gear mechanism at all. For this reason, there is such a problem that the torque bias ratio is difficult to be more increased.

SUMMARY OF THE INVENTION

The present invention has been accomplished in order to solve the above-mentioned problem. The features of the present invention reside in a combined differential gear device comprising a first differential gear mechanism including an input member driven for rotation, a pair of output members rotated by the input member through at least one planetary gear and a housing containing therein the input member and the pair of output members; and a second differential gear mechanism including a casing disposed within the housing, a pinion gear rotatably disposed within the casing and a pair of side gears rotatably disposed within the casing with their axes aligned with each other and meshed with the pinion gear; wherein the casing is divided into plural parts in a direction of the axes of the pair of side gears, one part of such divided parts, which supports the pinion gear, being rotatably disposed at the housing and non-rotatably connected to one of the pair of output members; another part of the divided parts, which supports one of the pair of side gears, being movable in a direction of the axes of the pair of side gears.

It is preferred that the casing is divided into three parts including an intermediate part which supports the pinion gear, and a pair of side parts which support the pair of side gears, respectively, the intermediate part is rotatably disposed with respect to the housing and non-rotatably connected to one of the pair of output members, and one of the pair of side portions is movable in the direction of the axes of the side gears. Especially, it is preferred that a part of the housing also serves as the other of the pair of side portions.

It is also preferred that the casing is divided into two parts including a part which supports the pinion gear and one of the pair of side gears and a part which supports the other side gear, the part, which supports the pinion gear and one of the pair of side gears, is movable in the direction of the axes of the pair of side gears, and a part of the housing also serves as the part which supports the other side gear.

It is accepted that the first differential gear mechanism includes an inner gear, a carrier and a sun gear whose axes are all aligned with one another, and at least one planetary gear rotatably disposed at the carrier and meshed with the inner gear and the sun gear, any one of the inner gear, the carrier and the sun gear serves as the input member, and the remaining two serve as the output members.

DETAILED DESCRIPTION OF THE INVENTION

Several embodiments of the present invention will now be described with reference to FIGS. 1 through 5.

Figure 1:
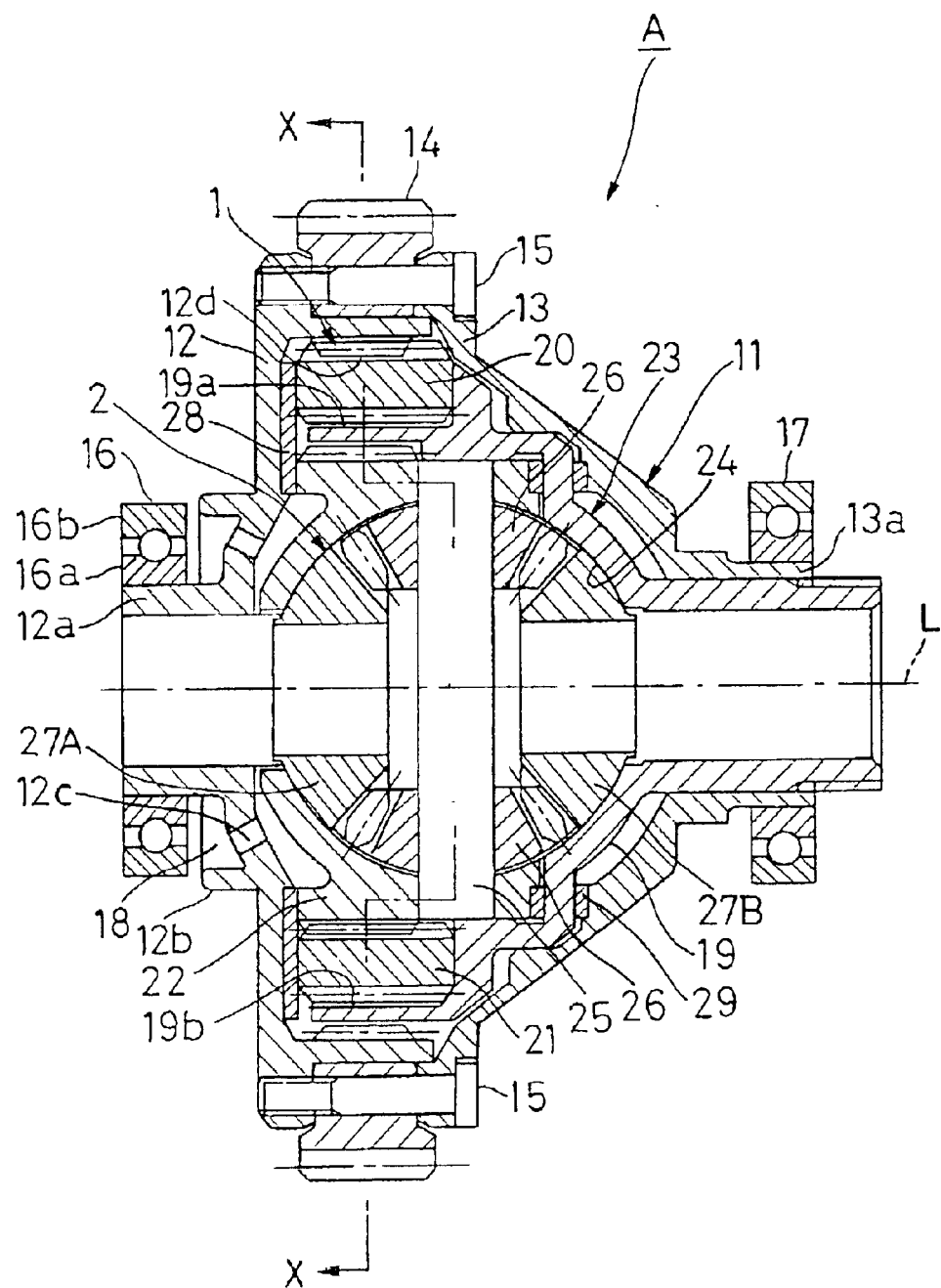
FIG. 1 is a sectional view taken on line Y—Y of FIG. 2, which shows a first embodiment of the present invention.
Figure 2:
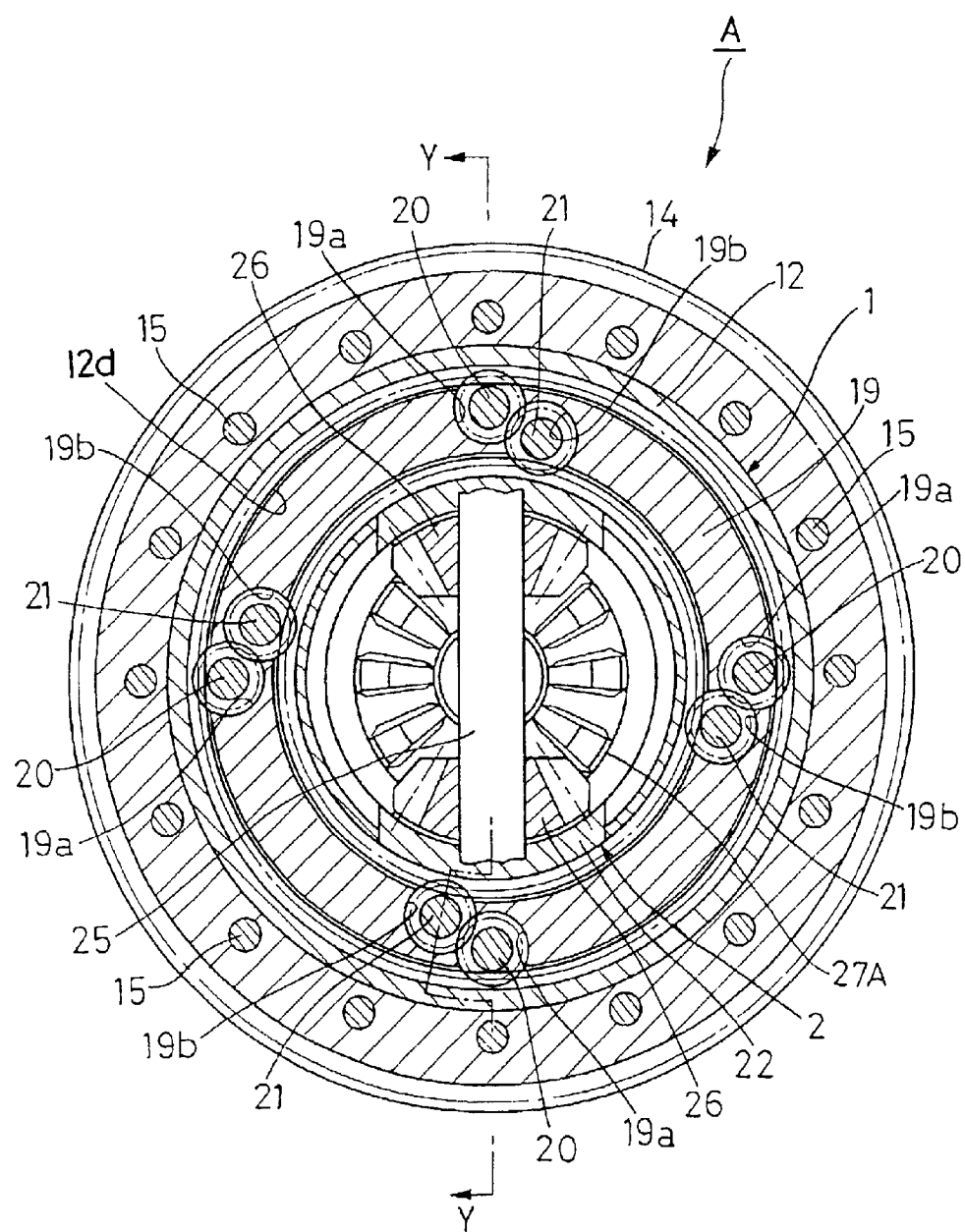
FIG. 2 is a sectional view taken on line X—X of FIG. 1.

FIGS. 1 and 2 shows a first embodiment of the present invention. A combined differential gear device A of this embodiment includes a first differential gear mechanism 1 and a second differential gear mechanism 2. Firstly, the first differential gear mechanism 1 will be described. Reference numeral 11 denotes a housing driven for rotation about an axis L. The housing 11 is constituted by a pair of half bodies 12, 13 which are arranged at one and the other end sides in the direction of the axis L. The pair of half bodies 12, 13 are in opposing relation with a ring gear 14 therebetween. By tightening a bolt 15 which is pierced through both the half body 13 and the ring gear 14 and threadingly engaged with the half body 12, the pair of half bodies 12, 13 are fixed together and the ring gear 14 is fixed to the half bodies 12, 13. The ring gear 14 is driven for rotation by an engine (not shown), thereby the housing 11 is driven for rotation about the axis L.

Cylindrical journal portions 12a, 13a are formed respectively on end portions of the half bodies 12, 13 which are located away from each other. The journal portions 12a, 13a are provided with bearings 16, 17, respectively. Through those bearings 16, 17, the housing 11 is rotatably supported on a differential gear device case (not shown) about the axis L. An annular protruded portion 12b protruding towards the bearing 16 is formed on a side surface of the half body 12 which is in opposing relation to the bearing 16. This annular protruded portion 12b has an outside diameter which is generally equal to an outside diameter of the bearing 16. An annular space 18 is defined by a side portion of the half body 12 covering an area from the annular protruded portion 12b to the journal portion 12a and by the bearing 16. A lubrication oil received in the differential gear device case passes through a gap between an inner wheel 16a and an outer wheel 16b of the bearing 16 and enters the annular space 18. The lubrication oil entered the space 18 passes through a through hole 12c formed in a side surface of the half body 12 facing the space 18 and is then introduced into the housing 11. It is preferred that the protruded portion 12b and the through hole 12c are also employed in the embodiments to be described hereinafter.

A carrier (output member) 19 is disposed within the housing 11 with an axis thereof aligned with the axis L. The carrier 19 can rotate about the axis L and can move in the direction of the axis L. An outer receiving hole 19a and an inner receiving hole 19b which form one pair, are formed in parallel with the axis L in the carrier 19. At least one pair (four pairs in this embodiment) of such outer and inner receiving holes are formed. The plural pairs of outer and inner receiving holes 19a, 19b are arranged at an equal distance away from each other in a circumferential direction of the carrier 19. The outer receiving hole 19a is arranged at an outer periphery side of the carrier 19 and its side portion at the outer periphery side is open outside from the outer peripheral surface of the carrier 19. On the other hand, the inner receiving hole 19b is arranged at a more inside than the outer receiving hole 19a and its side portion at the inner periphery side is open outside from the inner peripheral surface of the carrier 19. The adjacent side portions of the outer receiving hole 19a and the inner receiving hole 19b are intersected with each other, thereby the outer receiving hole 19a and the inner receiving hole 19b are communicated with each other.

Planetary gears 20, 21 are rotatably (about their own axes) received in the receiving holes 19a, 19b, respectively. The planetary gear 20 is in meshing engagement with an inner gear (input member) 12d formed on the inner peripheral surface of the half body 12 at an open portion on the outside of receiving hole 19a. The other planetary gear 21 is in meshing engagement with a sun gear (output member) 22 which is rotatably disposed within the housing 11 with its axis aligned with the axis L. Moreover, the planetary gears 20, 21 are meshed with each other at a communication portion of the receiving holes 19a, 19b. Accordingly, when the housing 11 is driven for rotation, the rotary torque input into the housing 11 is transmitted to the carrier 19 through the inner gear 12d and the planetary gears 20, 21 and further to the sun gear 22 from the planetary gear 21. When the planetary gears 20, 21 are not rotated about their own axes, the carrier 19 and the sun gear 22 are rotated at a same speed. However, when the planetary gears 20, 21 are rotated about their own axes, the carrier 19 and the sun gear 22 are differentially rotated in accordance with the rotation of the planetary gears 20, 21.

Next, the second differential gear mechanism 2 will be described. A casing 23 of the second differential gear mechanism 2 is constituted by the carrier 19 and the sun gear 22. Accordingly, the casing 23 is divided into two parts (the carrier 19 and the sun gear 22) in the direction of the axis L, and those two parts can move in the direction of the axis L. However, the carrier 19 and the sun gear 22, which are the above-mentioned two parts, are actually almost prohibited from moving in the direction of the axis L by the housing 11 and therefore, they can hardly move in that direction.

A receiving space 24 is formed within the casing 23. The receiving space 24 has a spherical configuration and its center is situated on the axis L. A support shaft 25 is disposed in this receiving space 24. This support shaft 25 is disposed such that its axis is orthogonal to the axis L and passes through the center of the receiving space 24. Opposite end portions of the support shaft 25 are supported on the sun gear 22. Accordingly, the support shaft 25 can rotate in unison with the sun gear 22.

A pair of pinion gears 26, 26 and a pair of side gears 27A, 27B each constituted by a bevel gear are received in the receiving space 24. The pair of pinions 26, 26 are turnably fitted to the opposite end portions of the support shaft 25 within the receiving space 24. A rear surface of the pinion gear 26 is constituted by a part of a spherical surface having a same radius of curvature as that of an inner peripheral surface of the receiving space 24. The rear surface of the pinion gear 26 is in contract with the inner peripheral surface of the receiving space 24. Accordingly, the pair of pinions 26, 26 are non-movable in the directions away from each other.

The pair of side gears 27A, 27B are arranged at one and the other end portions of the receiving space 24 in the direction of the axis L such that their axes are aligned with the axis L. A rear surface of each side gear 27A, 27B is constituted by a part of a spherical surface having a same radius of curvature as that of the inner peripheral surface of the receiving space 24. The rear surface of the side gear 27A is in contact with the inner peripheral surface of the receiving space 24 which is constituted by the sun gear 22. The rear surface of the other side gear 27B is in contact with the inner peripheral surface of the receiving space 24 which is constituted by the carrier 19.

The side gears 27A, 27B are in meshing engagement with the pair of pinion gears 26, 26. Accordingly, when the sun gear 22 is rotated, the pair of pinion gears 26, 26 are revolved about the axis L. By this, the pair of side gears 27A, 27B are caused to rotate about the axis L. At that time, when the pinion gear 26 is not rotated about its own axis, the pair of side gears 27A, 27B are rotated at a same speed, but when the pinion gear is rotated about its own axis, the pair of side gears 27A, 27B are differentially rotated in accordance with the rotation of the pinion gear.

The combined differential gear device A is used as a center and front differential gear device. For this reason, the carrier 19 is connected to a rear differential gear device (not shown), and the pair of side gears 27A, 27B are connected to the left and right front wheels (not shown), respectively. Of course, it is possible that the combined differential gear device A is also used as a center and rear differential gear device. In that case, the carrier 19 is connected to a front differential gear device (not shown), and the side gears 27A, 27B are connected to the left and right rear wheels (not shown), respectively.

In a combined differential gear device A thus constructed, when the housing 11 is rotated, the carrier 19 and the sun gear 22 are rotated. When the sun gear 22 is rotated, the pinion gear 26 is driven for rotation through the support shaft 25 and therefore, the pair of side gears 27A, 27B, which are in meshing engagement with the pinion gear 26, are driven for rotation. At that time, since each tooth of the pinion gear 26 and the side gears 27A, 27B has a pressure angle, the side gears 27A, 27B are pushed in the directions away from each other along the axis L due to their meshing engagement with the pinion gear 26. As a result, the side gear 27b presses the sun gear 22 against the housing 11 (half body 12) through a washer 28, and the side gear 27b presses the carrier 19 against the housing 11 (half body 13) through a washer 29. Accordingly, when the first differential gear mechanism 1 is differentially rotated, a friction resistance is generated between the housing 11 and the carrier 19 and between the housing 11 and the sun gear 22. As a result, a rotary torque is transmitted from one of the carrier 19 and the sun gear 22, which is rotated at a high speed, to the other which is rotated at a low speed, through the housing 11. Thus, a torque bias ratio between the carrier 19 and the sun gear 22 can be increased.

Next, other embodiments of the present invention will be described. In the embodiments to be described hereinafter, only those component parts which are different from the above-mentioned embodiment are described. Like component parts are denoted by like reference numeral and description thereof is omitted.

Figure 3:
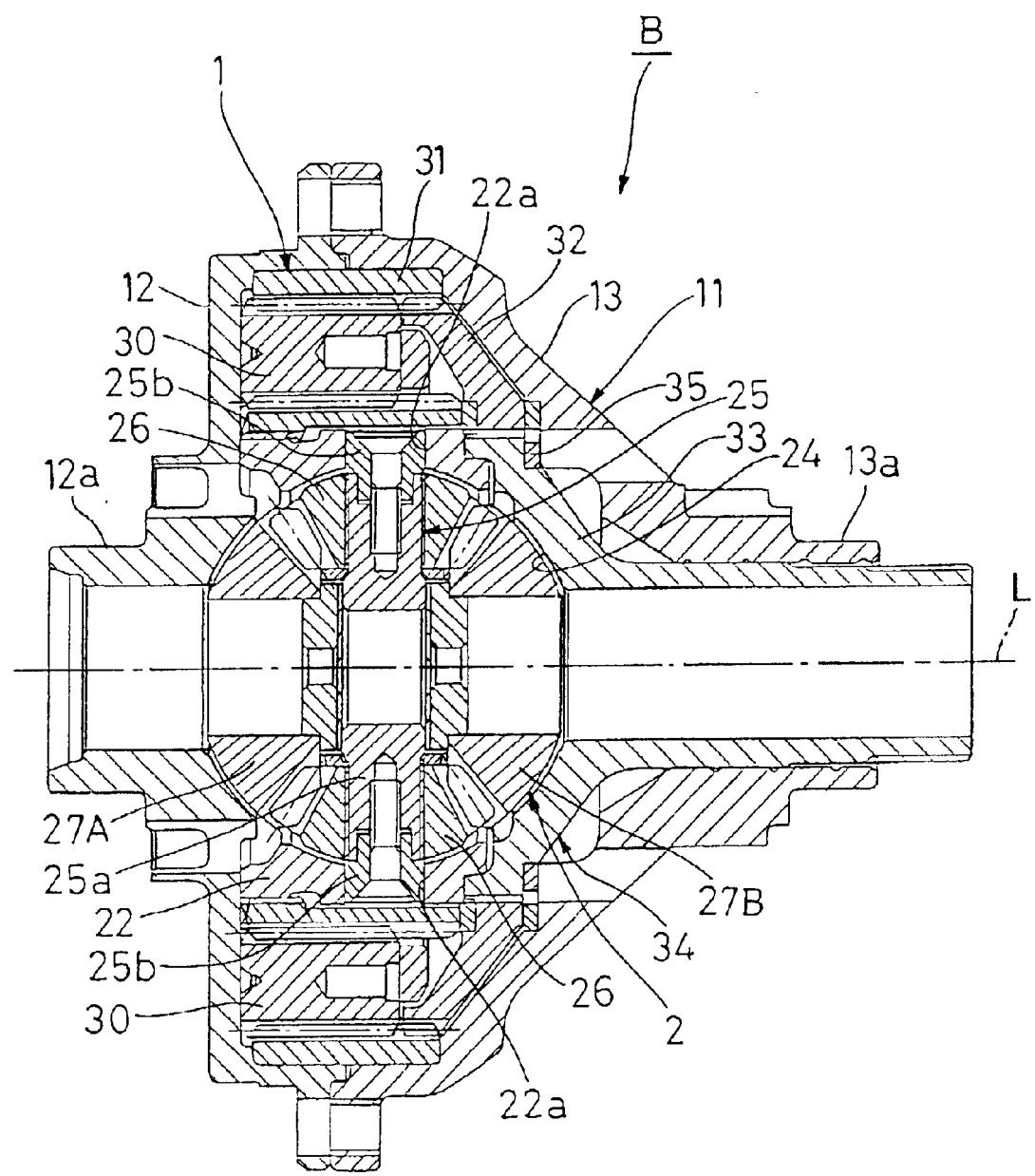
FIG. 3 is a sectional view, like FIG. 1, but showing a second embodiment of the present invention.

FIG. 3 shows a second embodiment of the present invention. In a combined differential gear device B of this second embodiment, only one kind of planetary gears 30 are used instead of the pair of planetary gears 20, 21 of the above-mentioned combined differential gear device A. In correspondence to the plural planetary gears 20, 21, plural planetary gears 30 are used. Moreover, each planetary gear 30 is supported on a half body 12 of a housing 11 (input member) such that the planetary gear 30 can rotated about its own axis. Accordingly, in the combined differential gear device B of this second embodiment, the carrier 19, which is used in the above-mentioned combined differential gear device A, is not used. Within the housing 11, an inner gear (output member) 31, which is separately formed from the housing 11, is rotatably disposed with its axis aligned with the axis L. The inner gear 31 is in meshing engagement with the planetary gear 30, and the planetary gear 30 is also in meshing engagement with a sun gear (output member) 22. Accordingly, when the housing 11 is driven for rotation, the inner gear 31 and the sun gear 22 are rotated. As apparent from this, a first differential gear mechanism 1 is constituted by the housing 11, the planetary gear 30, the inner gear 31 and the sun gear 22.

An outer periphery of an intermediate member 32 is fitted to an end portion of the inner gear 31 on the side of the half body 12 such that the intermediate member 32 can rotate in unison with the inner gear 31. An output cylinder 33, whose axis is aligned with the axis L, is non-rotatably fitted to an inner periphery of the intermediate member 32. Accordingly, the rotary torque transmitted from the housing 11 to the inner gear 31 through the planetary gear 30 is transmitted to the output cylinder 33 through the intermediate member 32. Then, the rotary torque is transmitted from the output cylinder 33 to the rear or front differential gear device.

In this combined differential gear device B, a casing 34 (casing of a second differential gear mechanism 2) corresponding to the casing 23 of the combined differential gear device A is constituted by a central portion of the half body 12 of the housing 11, the sun gear 22 and the output cylinder 33. That is, the casing 34 is divided into three parts in the direction of the axis L, and a receiving space 24 is constituted by those three parts. Of all the parts defining the receiving space 24, the part (intermediate part) constituted by the sun gear is in contact with a pinion gear 26, the part (side part) constituted by the half body 12 is in contact with a side gear 27A, and the part (side part) constituted by the output cylinder 33 is in contact with the side gear 27B. The output cylinder 33 is supported on the housing 11 such that the output cylinder 33 can move in the direction of the axis L. Accordingly, when the meshing engagement between the pinion gear 26 and the side gear 27B causes a thrust force to be applied to the side gear 27B in a direction from the side gear 27A side towards the side gear 27B side, the output cylinder 33 is press contacted with the half body 13 of the housing 11 through a washer 35. Thus, when the inner gear 31 and the sun gear 22 are differentially rotated, a friction resistance is generated between the half body 13 and the output cylinder 33 and a rotary torque having a magnitude corresponding to the friction resistance is transmitted to one of the inner gear 31 and the sun gear 22 which is rotated at a high speed to the other which is rotated at a low speed. By this, the torque bias ratio is increased.

In this embodiment, the support shaft 25 is divided into three parts including an intermediate part 25a whose length is generally equal to the inside diameter of the receiving space 24, and two end portions 25b, 25b fitted to the support hole 22a of the sun gear 22. By this, the support shaft 25 can easily be assembled to the sun gear 22. The intermediate part 25a is provided at its central part with a pair of branching shaft portions (not shown) which are orthogonal to the axis of the intermediate part 25a and the axis L. Each branching shaft portion is rotatably provided with a pinion gear 26, too. That is, in this embodiment, a number, four, of the pinion gears 26 are provided. Of course, all pinion gears 26 are in meshing engagement with the side gears 27A, 27B.

Figure 4:
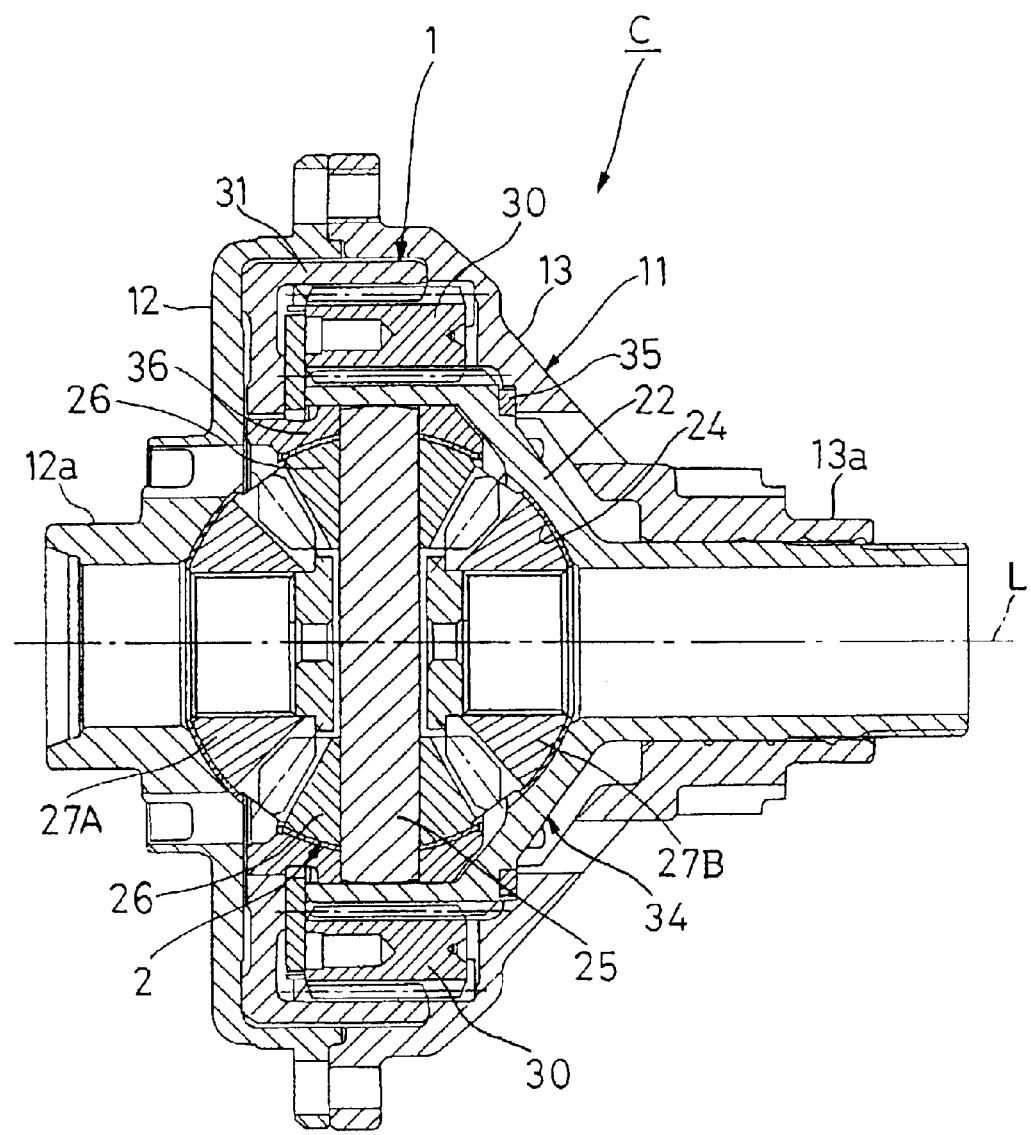
FIG. 4 is a sectional view, like FIG. 1, but showing a third embodiment of the present invention.

FIG. 4 shows a third embodiment of the present invention. Also in a combined differential gear device C of this third embodiment, a casing 34 of a second differential gear mechanism 2 is divided into three parts in a direction of an axis L, and the casing 34 is constituted by a central part (side part) of a half body 12, a retainer part (intermediate part) 36 having a cylindrical configuration and a part (side part) of a sun gear 22. The retainer part 36 is spline connected to an inner gear 31 so that it can rotate in unison with the inner gear 31. This retainer part 36 is provided with a support shaft 25. Accordingly, a pinion gear 26 is in contact with an inner peripheral surface of the retainer part 36 which defines a part of a receiving space 24. Of course, a side gear 27A is in contact with the central part of the half body 12 which defines the receiving space 24, and a side gear 27B is in contact with the sun gear 22 which defines the receiving space 24. Accordingly, in this combined differential gear device C, when the housing 11 is driven for rotation, the sun gear 22 is pressed against the housing 11 through a washer 35. Thus, the torque bias ratio is increased.

As apparent from the foregoing description, in this combined differential gear device C, the retainer part 36 is non-rotatably connected to the inner gear 31 serving as one of the two output members, and the rotation of the sun gear 22 serving as the other output member is output to a rear or a front differential gear device. A planetary gear 30 is supported on a half body 13. All the remaining construction is same as that of the combined differential gear device B.

Figure 5:
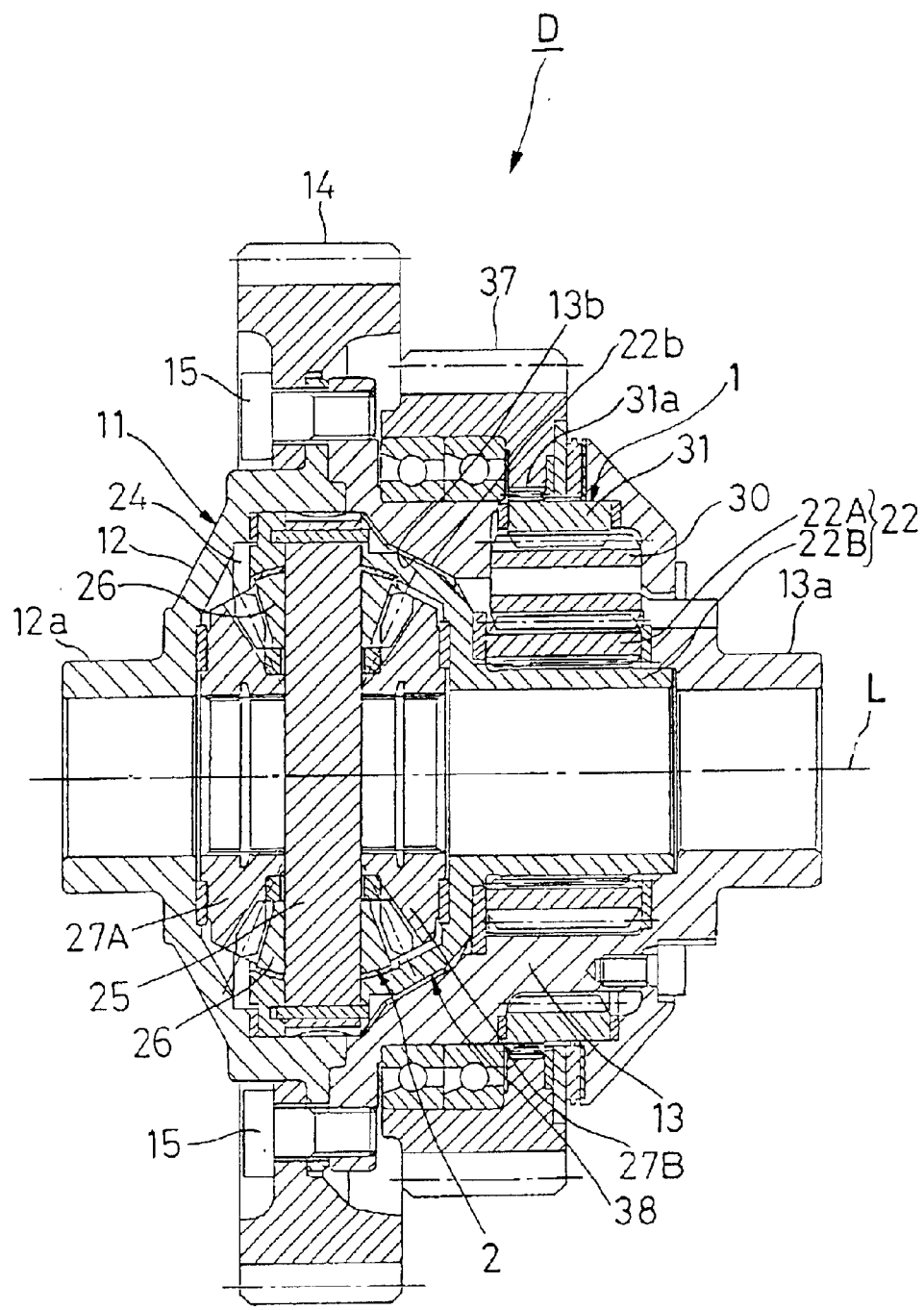
FIG. 5 is a sectional view, like FIG. 1, but showing a fourth embodiment of the present invention.

FIG. 5 shows a fourth embodiment of the present invention. In a combined differential gear device D of this fourth embodiment, a spline portion 31a is formed on an outer periphery of an inner gear 31. An output gear 37, which is rotatably supported on an outer periphery of a housing 11, is non-rotatably fitted to this spline portion 31a. Accordingly, the rotary torque transmitted to the inner gear 31 is transmitted to the output gear 37 and then, transmitted from the output gear 37 to a rear or front differential gear device.

In this combined differential gear device D, a casing 38 of a second differential gear mechanism 2 is constituted by a sun gear 22 and a half body 12 of the housing 11. That is, the sun gear 22 includes a gear portion 22A which is in meshing engagement with a planetary gear 30, and a casing component portion 22B whose one end portion (right end portion in FIG. 5) is non-rotatably spline connected to an inner periphery of the gear portion 22A. A receiving space 24 is defined by the other end portion of the casing component portion 22B and the half body 12. The casing component portion 22B defining the receiving space 24 is provided with a support shaft 25 and a pinion gear 26. A side gear 27B is in contact with an inner surface of the casing component portion 22B which faces the receiving space 24. The other side gear 27A is in contact with an inner surface of the half body 12 which faces the receiving space 24. Accordingly, when the housing 11 is driven for rotation, by reaction of meshing engagement between the side gear 27A and the pinion gear 26 and meshing engagement between the pinion gear 26 and the side gear 27B, the casing component portion 22B is pushed rightward in FIG. 5 and press contacted with a half body 13 of the housing 11. Thus, at the time of differential rotation, a friction resistance is generated between the casing component portion 22B and the half body 13 of the housing 11. Moreover, sine contact surfaces between the half body 13 and the casing component portion 22B are in the form of tapered surfaces 13b, 22b, respectively, a larger friction resistance is generated between the half body 13 and the casing component portion 22B. A rotary torque having a magnitude corresponding to this friction resistance is transmitted from one of the inner gear 31 and the sun gear 22, which is rotated at a high speed, to the other which is rotated at a low speed. By this, the torque bias ratio is increased.

The present invention is not limited to the above embodiments but many changes and modifications can be made in accordance with necessity.

For example, in the above embodiments, although the first differential gear mechanism 1 is constituted by the inner gear 12d (31), the planetary gears 20, 21 (30) which are in meshing engagement with the inner gear 12d (31), and the sun gear 22 which is in meshing engagement with the planetary gears 20, 21 (30), it may be constituted, as disclosed in Japanese Patent Application Laid-Open No. H10-220556, by a housing driven for rotation, at least a pair of planetary gears which are rotatably disposed at the housing for rotation about their own axes and meshed with each other, and a pair of side gears which are in meshing engagement with the planetary gears. In this case, the housing also serves as an input member and the pair of side gears serve as a pair of output members.

It is also accepted that the input member of the above embodiments serves as the output member and one of the pair of output members serves as the input member. For example, in the embodiment of FIGS. 1 and 2, although the inner gear 12d (housing 11) serves as an input member and the carrier 19 and the sun gear 22 serve as output members, it is also possible that the carrier 19 serves as an input member and the inner gear 12d and the sun gear 22 serve as output members.

What is claim is:

1. A combined differential gear device comprising:
   a first differential gear mechanism including a housing driven for rotation and a pair of output members rotated by said housing through at least one planetary gear; and
   a second differential gear mechanism including a casing disposed within said housing, a pinion gear rotatably disposed within said casing and a pair of side gears rotatably disposed within said casing with their axes aligned with each other and meshed with said pinion gear;
   said casing being divided into plural parts in a direction of the axes of said pair of side gears, one part of such divided parts, which supports said pinion gear, being rotatably disposed at said housing and non-rotatably connected to one of said pair of output members;
   another part of said divided parts, which supports one of said pair of side gears, being movable in a direction of the axes of said pair of side gears.

2. A combined differential gear device according to claim 1, wherein said casing is divided into three parts including an intermediate part which supports said pinion gear, and a pair of side parts which support said pair of side gears, respectively, said intermediate part is rotatably disposed with respect to said housing and non-rotatably connected to one of said pair of output members, and one of said pair of side parts is movable in the direction of the axes of said side gears.

3. A combined differential gear device according to claim 2, wherein a part of said housing also serves as the other of said pair of side parts.

4. A combined differential gear device according to claim 1, wherein said casing is divided into two parts including a part which supports said pinion gear and one of said pair of side gears and a part which supports the other side gear, said part, which supports said pinion gear and one of said pair of side gears, said part, which supports said pinion gear and one of said pair of side gears, is movable in the direction of the axes of said pair of side gears, and a part of said housing also serves as the part which supports the other side gear.

5. A combined differential gear device according to claim 1, wherein said first differential gear mechanism includes an inner gear, a carrier and a sun gear whose axes are all aligned with one another, and at least one planetary gear rotatably disposed at said carrier and meshed with said inner gear and said sun gear, any one of said inner gear, said carrier and said sun gear is coupled for rotation with said housing, and the remaining two serve as said output members.

6. A combined differential gear device according to claim 2, wherein said first differential gear mechanism includes an inner gear, a carrier and a sun gear whose axes are all aligned with one another, and at least one planetary gear rotatably disposed at said carrier and meshed with said inner gear and said sun gear, any one of said inner gear, said carrier and said sun gear is coupled for rotation with said housing, and the remaining two serve as said output members.

7. A combined differential gear device according to claim 3, wherein said first differential gear mechanism includes an inner gear, a carrier an a sun gear whose axes are all aligned with one another, and at least one planetary gear rotatably disposed at said carrier and meshed with said inner gear and said sun gear, any one of said inner gear, said carrier and said sun gear is coupled for rotation with said housing, and the remaining two serve as said output members.

8. A combined differential gear device according to claim 4, wherein said first differential gear mechanism includes an inner gear, a carrier and a sun gear whose axes are all aligned with one another, and at least one planetary gear rotatably disposed at said carrier and meshed with said inner gear and said sun gear, any one of said inner gear, said carrier and said sun gear is coupled for rotation with said housing, and the the remaining two serve as said output members.

* * * * *